Figure 1:
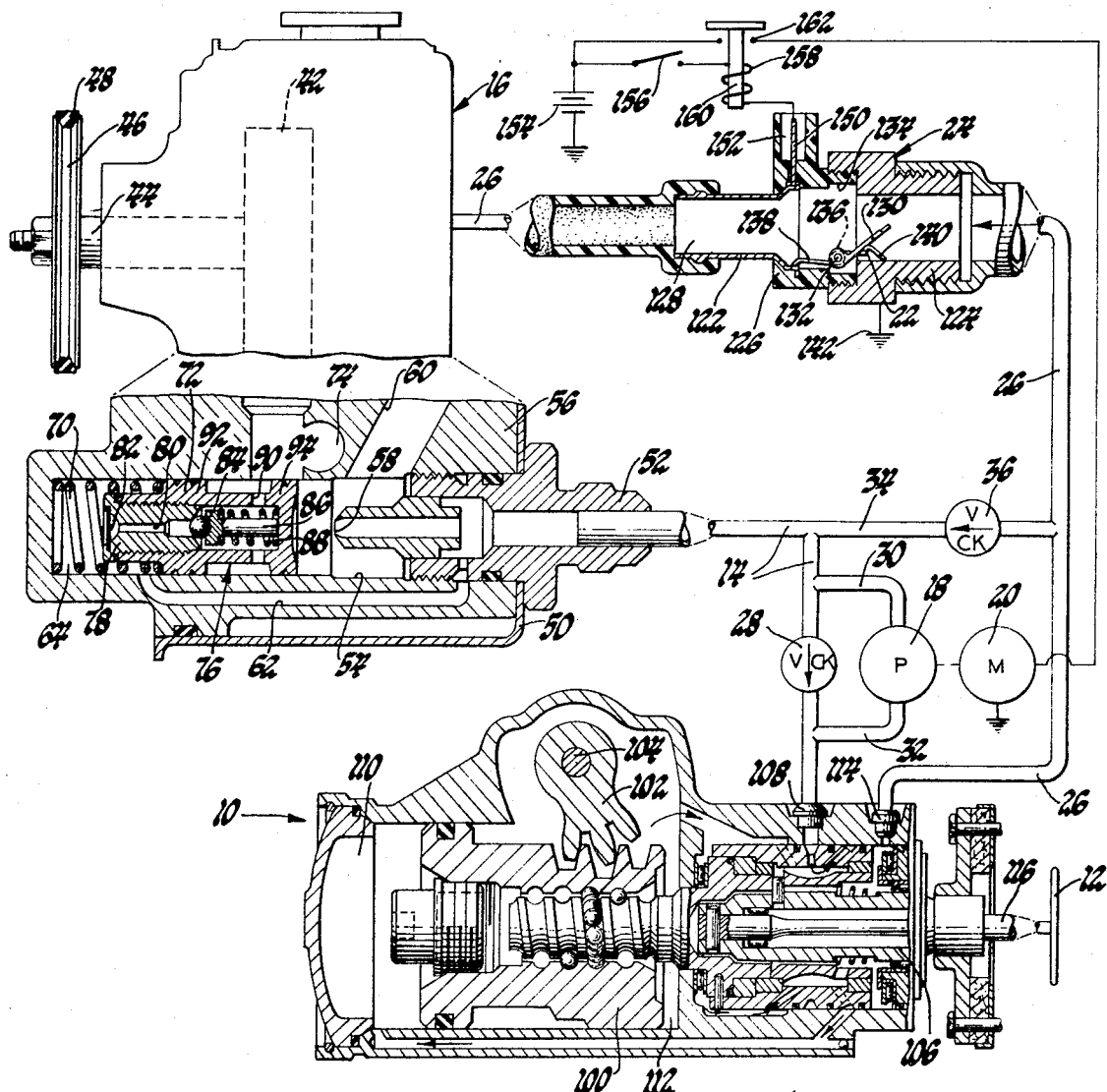

United States Patent [19]

Brewer

[11] 3,727,404
[45] Apr. 17, 1973

[54] HIGH PRESSURE STEERING SYSTEM

[75] Inventor: Lee M. Brewer, Saginaw, Mich.

[73] Assignee: General Motors Corporation, Detroit, Mich.

[22] Filed: Dec. 8, 1971

[21] Appl. No.: 205,848

[52] U.S. Cl ............................60/430, 180/79.2
[51] Int. Cl. ..........................................F15b 15/18
[58] Field of Search ............60/52 S; 180/79.2 R

[56] References Cited

UNITED STATES PATENTS

| 2,323,519 | 7/1943 | Dean | 60/60 UX |
| 3,280,557 | 10/1966 | Sattavara | 60/52 S |
| 3,424,262 | 1/1969 | Kunz | 60/52 S |
| 3,434,282 | 3/1969 | Shelhart | 60/52 S |

*Primary Examiner*—Edgar W. Geoghegan
*Attorney*—E. W. Cristen et al.

[57] ABSTRACT

A flow-valve-controlled fluid motor for operating the steering linkage of an engine-powered vehicle is connected with an engine-driven primary pump by a delivery passage and a return passage. An electric-motor-driven auxiliary pump and a first check valve are connected in parallel in the delivery passage so that the check valve normally permits flow only in a direction from the primary pump to the fluid motor when the primary but not the auxiliary pump operates and conditions the auxiliary pump to boost the pressure of the fluid from the primary motor when both pumps operate. A flow switch connected in the return passage includes a normally-closed switch that is connected in series with a vehicle battery and ignition switch and is operative to actuate the electric motor driving the auxiliary pump until opened by a flow at rates above a predetermined flow rate. A bypass passage connected between the return and delivery passages provides fluid to the auxiliary pump from the return passage and includes a second check valve that permits flow of this fluid only in a direction from the return passage to the delivery passage.

5 Claims, 2 Drawing Figures

PATENTED APR 17 1973

3,727,404

INVENTOR.
Lee M. Brewer
BY
Ronald L. Phillips
ATTORNEY

HIGH PRESSURE STEERING SYSTEM

This invention relates to circulating-fluid power steering systems and more particularly to power steering systems in which pressure fluid may be supplied to a fluid motor by two pumps.

In conventional power steering systems for power assisted turning of the wheels of an engine powered vehicle, an engine-driven pump provides pressure fluid to a fluid motor that operates the steering linkage in response to manual turning of the steering wheel. As the wheel is turned from its straight-ahead position, the pressure differential of the fluid applied across the fluid motor is increased to overcome the turning resistance of the wheels. While the pump normally has sufficient pressure building capability to meet the demands of the fluid motor, there are instances where this capacity is exceeded with the result that there is an increase in the level of manual driving effort required from that required when the manual steering is power assisted by the fluid motor.

To provide pressure fluid to the fluid motor in the event that the normal engine driven pump ceases to operate, it has been known to employ an auxiliary pump that operates independently of the primary pump and that is actuated in response to a drop in the pressure of the fluid provided by the primary pump. For example, the patents to Schiber, U.S. Pat. No. 3,558,239 and Shellfart, U.S. Pat. No. 3,454,282 disclose auxiliary pump systems activated upon cessation of primary pump operation.

However, besides primary pump stoppage, there are other more frequently occurring situations in which the pressure demanded by the fluid motor may exceed that deliverable by the pump. To protect the system against the effects of excessive pressures, the pump is conventionally provided with a pressure relief valve that is operative to limit the pressure delivered to the fluid motor to where it may be below that demanded. Such relief valve pressure limitations commonly occur during fast turning operations in parking maneuvers. Also, the demanded pressure may exceed the pressure building capacity of the pump simply because this capacity has been degraded through wear of pump components or through leakage.

In the power steering system according to the present invention, a conventional flow-valve-controlled fluid motor for operating the steering linkage of an engine powered vehicle is connected to a conventional primary pump by a fluid delivery passage and a fluid return passage. The primary pump includes a pressure-relief valve to protect the system against excessive pressure and also includes a flow-control valve that provides a substantially constant flow for pressure up to the relief valve setting. The control valve in the fluid motor is responsive to steering wheel displacement to increase the flow of pressure fluid to one side of the fluid motor while exhausting the fluid on the other side to the return passage. An electric-motor-driven auxiliary pump and a first check valve are connected in parallel in the delivery passage to normally permit flow only in a direction from the primary pump to the fluid motor when the primary pump but not the auxiliary pump operates and conditions the auxiliary motor to boost the pressure provided by the primary pump when both pumps operate. Due to the operation of the flow-control valve in the primary pump, the flow rate through the fluid motor control valve is substantially constant up to the relief valve setting. However, turning resistance resulting in a pressure demand above the relief valve setting retards fluid motor action and reduces the flow rate. A flow switch connected in the return passage includes a normally-closed switch that is connected in series with a vehicle battery and a vehicle ignition switch to actuate the electric motor driving auxiliary pump until opened by flow at rates above a predetermined low flow rate. A bypass passage between the return and delivery passages provides fluid delivery from the return passage to the auxiliary pump when the auxiliary pump but not the primary is operative, and this bypass passage includes a second check valve that permits flow only in a direction from the return passage to the delivery passage.

It is therefore an object of the present invention to add to the conventional pump and power steering unit of a recirculating fluid power steering system, an auxiliary pump and flow switch to serve the dual functions of supplying additional pressure during peak demand above the capability of the primary pump and also supplying reserve flow in the event of primary pump stoppage.

It is also an object of the present invention to provide in a power steering system having a primary pump for normally providing pressure fluid to a flow-valve-controlled fluid motor that operates the steering linkage, a flow switch and an auxiliary pump that is actuated by the fluid switch at flow rates less than a predetermined flow rate where the auxiliary pump provides pressure fluid to the fluid motor independently of or in cooperation with the primary pump.

It is another object of the present invention to provide a power steering system of the foregoing type wherein the primary pump normally provides pressure fluid to the fluid motor and the auxiliary pump provides pressure fluid to the fluid motor when the primary pump is not operative and also boosting the pressure of flow from the primary pump when the primary pump is operative but does not produce pressure demanded by the fluid motor.

It is a further object of the present invention to provide a power steering system of the foregoing type wherein the primary pump has a pressure relief valve to protect against the effects of high pressure and the auxiliary pump cooperates with the primary pump to provide pressure fluid to the fluid motor at pressures in excess of that permitted by the pressure relief valve.

It is a further object of the present invention to provide a power steering system of the foregoing type wherein a first check valve is connected in parallel with the auxiliary pump in the delivery passage to normally permit flow only in a direction from the primary pump to the fluid motor when the primary pump is operative and also connecting the auxiliary pump in series with the primary pump when both are operative.

It is a further object of the present invention to provide a power steering system of the foregoing type wherein a second check valve is connected in a bypass passage between the return and delivery passages to provide fluid from the return passage to the auxiliary pump when the auxiliary pump is operative and to prevent flow from the primary pump to the return passage when both pumps or just the primary pump are operative.

Figure 2:
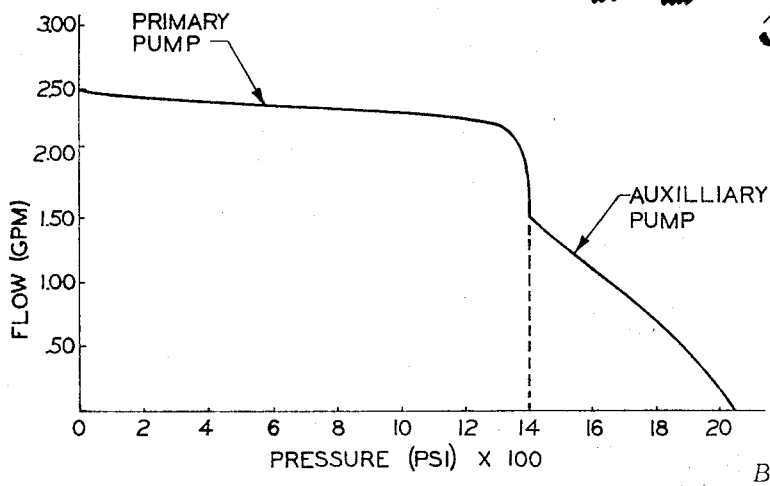

These and other features and objects of the present invention will become more apparent with reference to the following description taken in conjunction with the following drawing wherein:

FIG. 1 is a view partly in outline, partly in schematic, and partly in cross section of a power steering system constructed in accordance with the present invention; and FIG. 2 is a representative flow versus pressure characteristic of pressure fluid flow effected by a power steering system constructed in accordance with the present invention.

With reference now to FIG. 1, there is shown a power steering system for turning the wheels of a vehicle powered by an internal combustion engine. The system includes a power steering gear unit 10 actuated in response to rotation of a steering wheel 12. Power steering unit 10 includes a fluid motor powered with pressure fluid delivered through a delivery passage 14 and normally pressurized by an engine-driven primary pump 16. Operating independently or cooperatively with primary pump 16 as explained below is an auxiliary pump 18 driven by a vehicle-battery-powered electric motor 20 energized through a normally-closed switch 22 contained in and responsive to the flow of fluid through a flow switch 24 connected in a return flow passage 26 for returning fluid from steering unit 10 to either primary pump 16 or auxiliary pump 18.

Connected in delivery passage 14 to normally permit flow only in a direction from primary pump 16 to steering unit 10 when primary pump 16 is operative and auxiliary pump 18 is inoperative is a check valve 28. Auxiliary pump 18 has an inlet passage 30 and an outlet passage 32 communicating with discharge passage 14 upstream and downstream of first check valve 28 and thereby connecting pump 18 in parallel with check valve 28. Connected between return passage 26 and delivery passage 14 is a return bypass passage 34 including a second check valve 36 for providing a circuit for delivering fluid to auxiliary pump 18 when operative and for normally preventing flow in a direction from delivery passage 14 to return passage 26 when pump 16 is operative. Connected in delivery passage 14 and bypass passage 34 respectively as described, check valves 28 and 36 cooperate to permit flow from primary pump 16 to steering unit 10 when pump 16 but not pump 18 is operative and also cooperate to connect pump 18 in series with pump 16 when both pumps are operating and further cooperate to supply return fluid from steering unit 10 to be pressurized by pump 18 when pump 18 but not pump 16 is operating.

Power steering pump 16 is of conventional construction and may accord, for example, with the disclosure of U.S. Pat. No. 3,207,077, issued to P. B. Zeigler on Sept. 21, 1969, and assigned to the assignee of the present invention. Pump 16 is of the rotary-vane-type having an impeller indicated at 42 driven by an input shaft 44 which is connected to be driven by the engine by pulley 46 and belt 48, the pulley on the engine not being shown. As indicated, a reservoir housing 50 is constructed as a unit with impeller unit 42 and is adapted to hold a supply of fluid from which the impeller unit 42 draws to supply pressurized fluid through an outlet fitting 52 externally connected with delivery passage 14. A bore 54 is provided in body 56 of pump 16 to threadably receive pump outlet fitting 52 having a flow-control orifice 58 seated therein for communicating fluid from an impeller discharge passage 60 to both outlet fitting 52 and to a passage 62 communicating with a chamber 64 in the end of bore 54 opposite the end receiving fitting 52. Translatable in bore 54 and biased toward flow-control orifice 58 by a spring 70 in chamber 64 is double-land flow-control bypass valve 72 movable to control flow from impeller discharge passage 60 to a reservoir return passage 74 in response to the downstream pressure differential created across flow-control orifice 58 and communicated through passage 62 to the left side of valve 72. For normal operation of pump 16, flow-control orifice 58 and flow-control valve 72 cooperate to limit the flow rate provided to less than a predetermined maximum, for example, 2.5 gallons per minute, as shown in the left-hand portion of FIG. 2.

Flow control valve 72 carries a relief valve generally indicated at 76 having a threaded plug 78 bearing an axial passage 80 provided with a filtering screen 82 at one end and a check valve at the other end. The check valve includes a ball 84 urged to seat on the plug 78 by means of a plunger 86 and a coil spring 88. The relief valve bears a port 90 between lands 92 and 94 of valve 72 so placed as to continually communicate with reservoir return passage 74. Pressure is built up in impeller discharge passage 60 when the power steering unit 10 is actuated to overcome turning resistance. As the pressure increases in discharge passage 60, it also increases in chamber 64 so that additional pressure is required to move flow-control valve 72 to bypass fluid from passage 60 to passage 74. While the maximum amount of pressure buildup depends on the amount of turning resistance applied to power steering unit 10, if the pump output pressure exceeds a selected relief setting of the relief valve, for example, about 1385 psi as shown in the characteristic in FIG. 2, the increased pressure in spring chamber 64 forces relief valve ball 84 to open and allow fluid to escape from spring chamber 64 through relief port 90 into reservoir return passage 74. As pressure is relieved in spring chamber 64, the high pressure in pump discharge passage 60 overcomes the spring load to open the flow-control valve 72. Because the outlet pressure has to pass through flow-control orifice 58 to get into the spring chamber 64, the pressure in spring chamber drops below the outlet pressure for a fraction of a second. This allows the flow-control valve 72 to open enough to lower the line pressure promptly to the pressure setting of relief valve 76, such pressure being selected at a level that may be safely withstood by the components and structures comprising pump 16. Pump 16 thus normally provides fluid at a constant flow for pressures up to the setting of the relief valve.

Power steering unit 10 is also of conventional construction and may accord generally with the disclosure of U.S. Pat. No. 3,022,772 issued to P. B. Zeigler et al. on Feb. 27, 1962, and assigned to the assignee of the present invention. As more fully explained in the Zeigler et al. patent, steering unit 10 includes a fluid motor having a piston 100 connected by a suitable rack and sector reduction gearing 102 to drive a pitman shaft 104 adapted for connection with the vehicle steering linkage. The power steering unit 10 further includes a rotary control valve 106 in general coaxial alignment with fluid motor piston 100 and operated through a rotary input corresponding to rotation of steering wheel 12. Control valve 106 is of the open center flow configuration wherein incoming pressure fluid is delivered by delivery passage 14 to an inlet port 108 and freely circulates through the control valve portion of the steering gear and between two fluid chambers 110 and 112 at either side of the piston 100 when the control valve is in neutral or nonactuated position. Such free circulation through the steering gear is ultimately exhausted through an outlet port 114 to return passage 26.

As also explained more fully in the Zeigler et al. patent on this steering gear, input steering rotation in either direction of a stub shaft 116 causes gradual closing of one set of ports in control valve 106 leading to one of the sides of piston 100 while concurrently opening another set of ports leading to the other side of the piston. This gradually builds up the pressure differential across the sides of the fluid motor piston 100 to overcome the turning resistance acting on the wheels and coupled to the piston through shaft 104 and gear 102 thereby providing power assist. When the pressure buildup is sufficient to overcome the turning resistance, piston 100 is moved, for example, to the right as shown in FIG. 1, as pressure fluid fills one side 110 and is expelled from the other 112 and is allowed to return to pump 16 through control valve 106 and return passage 26.

In most every operation of power steering unit 10, fluid continuously circulates through the control valve and fluid motor portions of the steering gear to exit at outlet return passage 26 but in certain conditions such flow may approach zero. In parking maneuvers where the vehicle moves slowly, if at all, the turning resistance is high due predominantly to sliding friction rather than the normal and lower rolling friction when the vehicle is moving. The turning resistance especially if fast turning is desired while the brakes are applied may demand greater pressure on one side of the piston than the pump is capable of providing, for example, because relief valve 76 in the pump opens. In this situation the control valve 106 limits the fluid being returned to that being expelled from the low pressure side of the piston and with insufficient pressure on the pressurized side the piston moves only if substantial manual turning effort is applied. If the piston does not move because such effort is not applied, the return flow drops to a point where flow switch 24 actuates electric motor 20 to cause pump 18 to boost the pressure provided by pump 16 until the pressure demand is met. For example, and with reference to the pressure-flow characteristic shown in FIG. 2, the primary pump 16 provides a substantially constant flow rate of 2.5 gallons per minute until the pressure demand exceeds about 1385 psi, at which point the flow rate would drop to about 1.5 gallons per minute where flow switch 24 would cause auxiliary pump 18 to provide up to 2100 psi.

In the event pump 16 does not operate to provide fluid of the pressure demanded by steering unit 10, flow control switch 24 responds to the resulting decreased flow rate to activate auxiliary pump 18. Flow control switch 24 may be of the type described in copending U.S. patent application Ser. No. 181,883, filed Sept. 20, 1971, on a "Flow Switch Assembly" by A. A. Ranft et al., and assigned to the assignee of the present application. In its preferred form, flow switch 24 comprises a pair of tubular metal housing members 122 and 124 suitably connected into return passage 26 and insulated from each other by a nonconductive fitting 126. Tubes 122 and 124 with fitting 126 define a flow passage 128 through switch assembly 24 which also includes a vane 130 which is pivoted at 132 for movement between a closed switch position and an open switch position and a helical spring 136 which normally biases vane member 130 to the closed position in which opposite ends 138 and 140 of spring 136 engage metal members 122 and 124 to provide a conductive path therebetween to ground 142.

At a fluid flow in excess of a predetermined flow rate, vane 130 is moved, here counterclockwise, from its closed switch position normally closing the conductive path between the metal members to its open switch position thereby breaking the conductive path. An electrical terminal 150 is retained in electrical contact with tubular member 122 by fitting 126 and is exposed in a protective pocket 152 for electrical connection to vehicle battery 154 through ignition switch contact 156, normally closed during vehicle operation, and through coil 158 for actuating solenoid plunger 160. At return flow rate less than the predetermined flow rate, spring 136 completes an electrical circuit to ground 142 causing the closure of normally open solenoid contacts 162 and thereby applying energizing power to motor 20 from battery 154.

Since flow switch 24 energizes electric motor 20 when the flow falls to the predetermined flow rate and since initiation of pumping action by pump 18 tends to increase the flow rate slightly, it has been found desirable to provide some "hysteresis" between the flow rates at which the flow switch 24 activates and deactivates pump 18. Otherwise, pump 18 would cycle on and off when the flow rate is at the predetermined flow rate. Switch 24 provides such a hysteresis. As more fully explained in the above-cited Ranft application, this hysteresis causes vane 130 to be moved and held in its open position at flows above the predetermined flow rate and to be closed when the flow decreases slightly below this flow rate. When thus activated by switch 24 below the predetermined flow rate, pump 18 increases the pressure of the fluid provided at the inlet 108 of steering unit 10 to meet the pressure demanded, as shown generally by the right-hand portion of the FIG. 2 characteristic.

Auxiliary pump 18 as well as inlet and outlet passages 30 and 32 thereof and also check valves 28 and 36 may be incorporated into a pump body secured directly to power steering unit 10. Moreover, flow switch 24 could also be secured directly to such a pump body. In addition to the manufacturing advantages associated with such a unitized auxiliary pump-steering unit structure, power steering unit inlet port 108 would communicate directly with pump outlet 32 thereby avoiding the need of higher pressure tubing that would otherwise be needed between auxiliary pump outlet passage 32 and steering inlet port 108 than used between primary pump outlet fitting 52 and steering unit 10.

During the normal operation when the pump 16 is operative to provide fluid above the predetermined flow rate under pressures not exceeding the setting of relief valve 76, pressure fluid is provided to inlet port 108 of steering unit 10 from outlet fitting 52 of pump 16, delivery passage 14 and check valve 28 connected therein. This fluid is circulated through steering unit 10 and open center control valve 106 thereof to be exhausted to return line 26 at port 114. Check valve 36 is closed during such normal operation by the pressure differential between the high pressure fluid in delivery passage 14 and the lower pressure fluid in return passage 26. The flow in passage 26 is of a sufficient rate to turn vane 130 of flow switch 24 from the normally-closed position where the ends 138 and 140 of spring 136 contact both tubes 122 and 124 to an open position where spring end 140 does not contact member 124 and vane 130 clears recess 134. With such flow, the electrical path energizing electric motor 20 from vehicle battery 154 is opened at solenoid contacts 162.

Should the flow rate fall below the predetermined value with primary pump 16 still operative, spring 136 overcomes the effect of the flow rate on vane 130 to allow spring end 140 to contact grounded tube 124 to complete a circuit for energizing solenoid coil 158 from vehicle battery 154, ignition switch 156, flow switch connector 150, tube 122, spring 136, tube 124 to ground 142. Solenoid plunger 160 is then operated to establish a connection to electric motor 20 through normally open relay contacts 162. Electric motor 20 then boosts the pressure provided to its inlet 30 from pump 16 through delivery passage 14 to provide a higher pressure at outlet passage 32, the higher pressure at outlet passage 32 compared to that at inlet passage 30 closing check valve 28. Such closure of check valve 28 prevents the pressure increase developed by pump 18 from being communicated back to pump 16 and also allows relief valve 76 to remain effective in protecting against the effects of excessive pressure. Also, during such pressure boost operation, check valve 36 is still closed due to the higher pressure in delivery passage 14 compared to the pressure of the fluid in return passage 26. Pumps 16 and 18 thus operate in series and are conditioned by check valves 28 and 36 to provide fluid at pressures demanded by steering unit 10 to overcome turning resistance reflected to piston 100 through pitman shaft 104 and gear 102.

Should pump 16 for some reason not provide fluid under pressure, pump 18 is activated as indicated above as soon as the flow through the open center valve 106 and steering unit 10 decreases because the pressure demanded by the turning resistance is not being provided. Check valve 36 is then opened by the higher pressure in return passage 26 compared to the pressure in delivery passage 14 to provide fluid to inlet 30 of pump 18. Pump 18 then provides fluid at pressures sufficient to operate steering unit 10.

Having described one embodiment of the present invention, it is understood that the specific terms and examples are employed in a descriptive sense only and not for the purposes of limitation. Other embodiments of the invention, modifications thereof, and alternatives thereto may be used. I therefore aim in the appended claims to cover such modifications and changes as fall within the true spirit and scope of my invention.

What I claim as new and desire to secure by Letters Patent of the United States is:

1. In a power steering system:
   a. a fluid motor for operating a steering linkage of a vehicle and having a fluid inlet and a fluid outlet;
   b. a first pump having an inlet and an outlet, said first pump having an operative condition in which it provides for pumping fluid from said first pump inlet to said first pump outlet and having an inoperative condition in which it does not provide this operation;
   c. a fluid delivery passage for delivering fluid from said first pump outlet to said fluid motor inlet;
   d. a fluid return passage for returning fluid from said fluid motor outlet to said first pump inlet;
   e. a return bypass passage including a first check valve for preventing flow from said return passage to said delivery passage when said first pump is in said operative condition and for permitting flow from said return passage to said delivery passage when said first pump is in said inoperative condition;
   f. a second pump connected in said delivery passage, said second pump having an inoperative condition in which it does not increase fluid pressure at said motor inlet in said delivery passage and having an operative condition in which it increases fluid pressure at said fluid motor inlet of fluid delivered to said fluid delivery passage from either said first pump outlet when said first pump is in said operative condition or from said fluid return passage and said bypass passage when said first pump is in said inoperative condition;
   g. flow responsive switch means communicating with said fluid return passage for causing said second pump to be in said operative condition when flow in said fluid return passage is below a predetermined flow rate and causing said second pump to be in said inoperative condition above said flow rate; and
   h. a second check valve connected in said delivery passage for permitting flow from said first pump outlet to said fluid motor unit inlet when said second pump is in said inoperative condition, said second check valve being closed by said pressure increase provided by said second pump at said fluid motor inlet when said second pump is operative thereby causing fluid to be pumped to said fluid motor inlet by said second pump from either said first pump outlet or said fluid motor outlet.

2. In a power steering system:
   a. a power steering gear unit for operating a steering linkage of a vehicle, said steering unit having a fluid motor with a fluid inlet passage and a fluid outlet passage;
   b. a first pump having an operative condition in which it provides fluid and an inoperative condition in which it does not provide this operation;
   c. a flow control valve connected to control the flow of fluid provided to said fluid motor to a first predetermined flow rate;
   d. a fluid delivery passage having first and second portions for delivering fluid from said first pump to said fluid motor inlet passage;
   e. a fluid return passage for returning fluid from said fluid motor outlet passage to said first pump;
   f. a return bypass passage for diverting fluid from said return passage to said delivery passage;

g. a first check valve connected in said bypass passage for preventing flow from said delivery passage to said return passage when said first pump is in said operative condition and for permitting flow from said return passage to said delivery passage when said first pump is in said inoperative condition;

h. a second pump connected in said first portion of said fluid delivery passage and having an inoperative condition in which it does not increase the pressure of the fluid at said fluid motor inlet passage and an operative condition in which it increases the pressure of the fluid in said fluid motor inlet passage;

i. flow responsive switch means communicating with said return bypass passage for causing said second pump to be in said operative condition when the flow in said return passage is below a second predetermined flow rate less than said first predetermined flow rate and for causing said second pump to be in said inoperative condition above said second predetermined flow rate; and j. a second check valve connected in the second portion of said delivery passage for permitting flow in said second portion of said delivery passage when said second pump is in said inoperative condition and for preventing flow in said first portion of said delivery passage when closed by the pressure increase provided at said fluid motor inlet passage by said second pump when it is in said operative condition.

3. In a power steering system:

a. a fluid motor for operating a steering linkage of a vehicle and having a fluid inlet and a fluid outlet for permitting flow through said fluid motor of pressure fluids having pressures that may exceed a predetermined pressure;

b. a first pump having an outlet and a fluid reservoir with an inlet, said first pump also having an operative condition in which it provides fluid at said outlet at pressures up to said predetermined pressure and having an inoperative condition in which it does not provide this operation;

c. a relief valve connected to limit the pressure of the pressure fluid provided by said first pump to less than said predetermined pressure;

d. a fluid delivery passage for delivering fluid from said first pump outlet to said fluid motor inlet;

e. a fluid return passage for returning fluid from said fluid motor outlet to said first pump inlet;

f. a return bypass passage including a first check valve for preventing flow from said return passage to said delivery passage when said first pump is in said operative condition and for permitting flow from said return passage to said delivery passage when said first pump is in said inoperative condition;

g. a second pump connected in said delivery passage, said second pump having an inoperative condition in which it does not increase the pressure of the fluid at said fluid motor inlet and having an operative condition in which it increases at said fluid motor inlet the pressure of the fluid provided in said fluid delivery passage from either said first pump outlet when said first pump is in said operative condition or from said fluid return passage and said return bypass passage when said first pump is in said inoperative condition;

h. flow responsive switch means communicating with said fluid return passage for causing said second pump to be in said operative condition when the flow in said fluid return passage is below a predetermined flow rate and causing said second pump to be in said inoperative condition above said flow rate; and i. a second check valve connected in said delivery passage for permitting flow from said first pump outlet to said fluid motor inlet when said second pump is in said inoperative condition, said second check valve being closed by said pressure increase provided by said second pump at said fluid motor inlet when said second pump is operative thereby causing fluid to be pumped to said fluid motor inlet by said second pump from either said first pump outlet or said fluid motor outlet.

4. In a power steering system:

a. a fluid motor for operating a steering gear unit of a vehicle;

b. a first pump having an outlet connected to deliver fluid to said fluid motor and having an inlet connected to return fluid from said fluid motor, said first pump having an operative condition in which it provides said fluid from said first pump inlet to said first pump outlet and an inoperative condition in which it does not;

c. a first check valve connected to prevent flow from said fluid motor to said first pump outlet when said first pump is in said operative condition and for permitting flow from said fluid motor to said first pump outlet when said first pump is in said inoperative condition;

d. a second pump connected with said first pump outlet, said first check valve, and said fluid motor to deliver pressure fluid to said fluid motor, said second pump having an inoperative condition in which it does not deliver fluid to said fluid motor and having an operative condition in which it increases the pressure of the fluid delivered to said fluid motor when said first pump is in said inoperative condition;

e. flow responsive means connected between said first pump and said fluid motor to cause said second pump to be in said operative condition when the flow between said first pump and said fluid motor is below a predetermined flow rate and to cause said second pump to be in said inoperative condition above said flow rate; and f. a second check valve connected to permit flow from said first pump to said fluid motor when said second pump is in said inoperative condition, said second check valve being closed by the pressure increase provided by said second pump when in said operative condition to cause fluid to be pumped to said fluid motor by said second pump.

5. In a power steering system for an engine-powered vehicle having means for turning the steerable wheels of the vehicle;

a. a fluid motor for operating said steering means and having a fluid inlet and a fluid outlet;

b. a first pump connected to said engine to be driven thereby and having an inlet and an outlet, said first pump having an operative condition in which it provides pressure fluid at said first pump outlet and having an inoperative condition in which it does not provide pressure fluid at said first pump outlet;

c. a fluid delivery passage for delivering fluid from said first pump outlet to said fluid motor inlet;

d. a fluid return passage for returning fluid from said fluid motor outlet to said first pump inlet;

e. a return bypass passage including a first check valve therein for diverting and limiting the direction of the flow of fluid from said return passage to said delivery passage;

f. a second pump connected in said delivery passage, said second pump having an inoperative condition in which it does not increase the pressure of the fluid at said fluid motor inlet and having an operative condition in which it increases at said fluid motor inlet the pressure of said fluid from either said first pump outlet when said first pump is in said operative condition or from said fluid return passage and said diversion passage when said first pump is in said inoperative condition;

g. an electric motor connected to actuate the second pump;

h. a battery;

i. wiring means connecting the battery and the electric motor to energize the motor from the battery, the wiring means including a normally-closed switch and an ignition switch connected in series;

j. reservoir means to supply the pumps with hydraulic fluid;

k. flow responsive switch means communicating with said fluid return passage for opening said normally-closed switch in response to flow in said return passage above a predetermined flow rate, and l. a second check valve connected in said delivery passage for permitting flow of said fluid from said first pump outlet to said fluid motor inlet when said second pump is in said operative condition, said second check valve being closed by said pressure increase provided by said second pump at said fluid motor inlet when said second pump is operative, thereby causing fluid to be pumped to said fluid motor inlet by said second pump from either said first pump outlet or said fluid motor outlet.

* * * * *